United States Patent
Dietz

[11] 3,792,248
[45] Feb. 12, 1974

[54] MEANS FOR CONTROLLING ILLUMINATION OF CONTROL OR SERVICE ELEMENTS ON MOTOR VEHICLE

[75] Inventor: Günter Dietz, Wuppertal-Barmen, Germany

[73] Assignee: GEBR Happich GmbH, Wuppertal-Elberfeld, Germany

[22] Filed: Aug. 1, 1972

[21] Appl. No.: 276,903

[30] Foreign Application Priority Data
Sept. 7, 1971 Germany.................. P 21 44 588.5

[52] U.S. Cl................ 240/1 EL, 240/2.1, 240/8.16, 350/96 R
[51] Int. Cl..................................... F21, B60q 3/04
[58] Field of Search . 240/8.16, 1 EL, 2.1; 350/96 R

[56] References Cited
UNITED STATES PATENTS
| | | | |
|---|---|---|---|
| 2,712,593 | 7/1955 | Merchant | 240/1 EL X |
| 2,965,749 | 12/1960 | Hudson | 240/1 EL X |
| 3,308,785 | 3/1967 | Hardesty | 240/8.16 X |
| 3,150,456 | 9/1964 | Roper | 240/8.16 X |
| 3,029,334 | 4/1962 | Anderson et al. | 240/1 EL |
| 2,761,056 | 8/1956 | Lazo | 240/1 EL X |
| 3,561,145 | 2/1971 | Shotwell | 240/1 EL X |

*Primary Examiner*—Samuel S. Matthews
*Assistant Examiner*—Richard A. Wintercorn
*Attorney, Agent, or Firm*—Ostrolenk, Faber, Gerb & Soffen

[57] ABSTRACT

A light guide for illuminating display elements in a vehicle, which elements are on the dashboard, or the like; the guide comprises a light source, and a light guide positioned over both the elements to be illuminated and the light source; the light guide has an exterior surface which is spaced away from the elements being illuminated and which curves gradually toward the surface to be illuminated along the direction away from the light source thereby to concentrate light in the light guide body remote from the source; in certain embodiments, a prismatically shaped light guiding body intersects the principal light guide for concentrating light at a particular display element.

11 Claims, 8 Drawing Figures

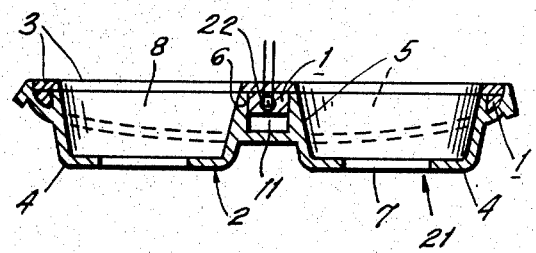
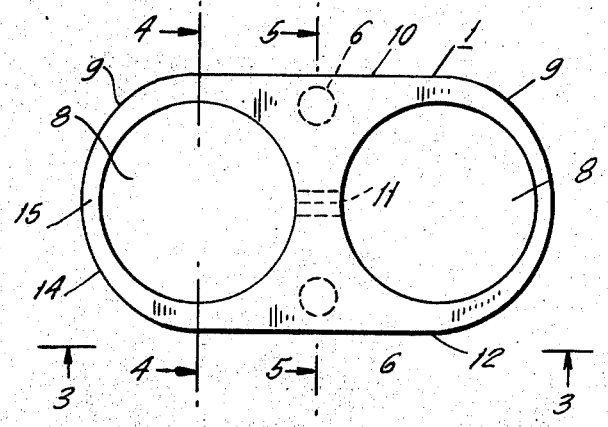
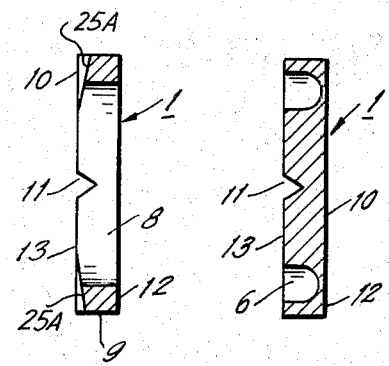
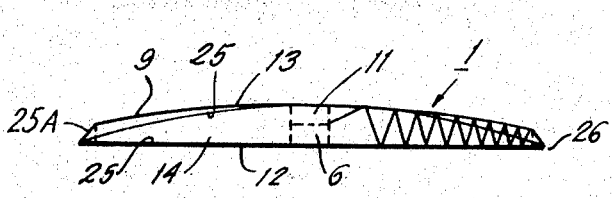
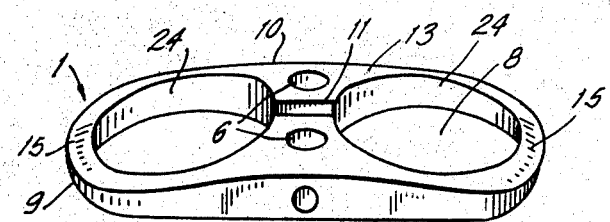
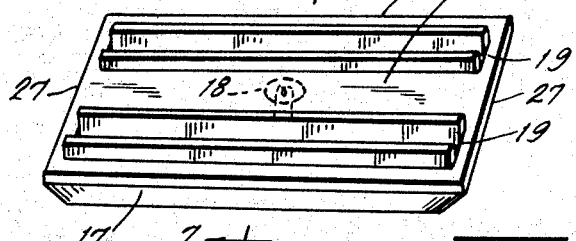
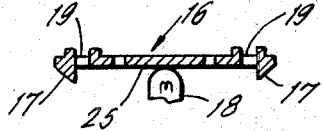

MEANS FOR CONTROLLING ILLUMINATION OF CONTROL OR SERVICE ELEMENTS ON MOTOR VEHICLE

The present invention relates to illumination by a remote light source of a display and particularly to illumination of control or service elements in a vehicle, e.g. on the vehicle dashboard. The invention comprises a light guide structure which transmits light from a central illumination source to the display and then enables the display to be uniformly illuminated.

Various light guide structures are known for illuminating displays, particularly wide displays which may include longitudinally disposed symbols. A light guide structure is capable of transmitting light through its interior. It is bounded by exterior surfaces, the interior sides of which reflect light when the angle of incidence of the light on the interior sides is greater than a critical angle, and permit light to pass through, when the angle of incidence is less than the critical angle. Since light from a central source is emitted in many directions, it is incident on the interior sides at various angles. Hence, light exits from the guide structure along its entire length.

Conventional light guide structures have bodies of uniform thickness over their entire length. The bodies may include openings through which control buttons and levers may pass. These conventional structures have the disadvantage that they do not adequately transmit the light and too much of the light is emitted near the source, whereby illumination from a central source rapidly decreases in intensity away from the source. This provides non-uniform illumination across the display and insufficient illumination of some of the remote sections of the display.

To overcome this drawback, the prior art provides a strong light source to illuminate the remote display sections. However, a strong light source may be disturbing, particularly when the display is being used in darkness, e.g., when the display is on the dashboard of a vehicle traveling along a darkened road. If the light source is adapted to the darkened conditions, the furthest display elements are not sufficiently illuminated. The difficulties in illuminating a display are increased when the illumination is indirect or when the light must pass through openings, particularly long slits, which greatly reduces the light transmitting ability of these light guide structures.

The present invention provides more uniform and adequate illumination of even remote sections of a display than the prior art. A light guide structure in accordance with the invention is shaped so that it continuously decreases in its cross-section in a direction that is both transverse to the direction in which light is transmitted through the light guide structure and is away from the light source toward the more remote sections of the display to be illuminated. Preferably, the decrease in cross section is nonlinear and gradually sloping away from the light source.

It is advantageous to provide the continuously reduced cross-section for the light guide structure by making at least one, and perhaps more than one, of the reflective interior sides of the exterior surfaces spheroidally concavely curved along the portion of the light guide away from the source of illumination toward the more remote sections of the display to be illuminated. The curved surfaces would usually comprise at least the surface opposite the surface of the display and might additionally comprise the surface adjacent to the display.

Usually, the light source is intermediate the ends of the light guide structure and the structure has decreasing cross-section extending away in opposite directions to the opposite ends of the structure. However, the light source need be spaced away from only one end of the structure and it is the portion of the structure between the light source and that one end that is of diminishing cross section.

In the preferred embodiment of the invention, the light guide structure not only reduces in cross-sectional area moving away from the light source, it gradually also changes its shape. For example, a light guide structure may start near the light source with a rectangular cross-section and its surface might gradually curve so that the structure develops a cross-section which is prismatic in shape, having three interior sides defined by three exterior surfaces. With such an arrangement of the light guide structure, light is selectively guided for reflection along one or the other of the interior sides of the exterior surfaces.

Light from the central source is transmitted through the light guide structure. The light strikes the interior sides of the exterior surfaces of the light guide and some of the light is reflected along the light guide structure. Light striking the interior sides of the exterior surfaces of the light guide is reflected at an angle of reflection equal to the angle of incidence of the light. Because of the reducing cross-section of the light guide structure, the angles of incidence and reflection of the light also gradually reduce in the direction away from the light source, whereby the light density increases with each reflection. The greater light density remote from the central light source of the light still being transmitted by the guide structure provides the more remote regions of the display with more intense illumination than might otherwise be expected.

If a special region of the display is to be illuminated with greater intensity than other nearby areas, the light guide may at that corresponding position have a prismatic shape, and this prismatic section would extend transversely to the normal transmission of light through the light guide. The additional prismatically shaped section may comprise a prism like body which is either placed over or passes through the main light guide structure. Only a portion of the light being transmitted through the main light guide structure should pass through the separate prismatic portion thereof leaving another sufficient portion of the light to be guided further along the light guide structure to the remote areas of the display requiring illumination.

In another embodiment of the invention, the light guide structure includes at least one open gap, with a prismatic body section being positioned beyond each gap and remote from the light source. This arrangement enables illumination along the gap edge surfaces of the light guide structure.

It is an object of the present invention to provide a light guide structure which adequately transmits illumination from a central source to remote sections of a display being illuminated.

It is another object of the invention to provide such a light guide structure which sufficiently illuminates the remote sections of the display even when they are so far from the light source as to preclude their being directly illuminated thereby.

It is a further object of the invention to provide such a light guide structure which uniformly illuminates the entire display.

The foregoing and other objects of the invention will be better understood from the following description of the accompanying drawings in which:

FIG. 1 is a longitudinal cross-sectional view through an illumination device carrying a light guide structure in accordance with the invention;

FIG. 2 is a top plan view of the light guide structure shown in FIG. 1;

FIG. 3 is a side view in the direction of arrows 3 in FIG. 2 of the light guide structure;

FIGS. 4 and 5 are cross-sections of the light guide structure of FIG. 2 along the lines and in the direction of arrows 4—4 and 5—5, respectively;

FIG. 6 is a top perspective view of the light guide structure viewed from the same side as the view in FIG. 3;

FIG. 7 is a longitudinal cross-sectional view through another type of light guide structure in accordance with the invention; and FIG. 8 is a top perspective view of the light guide structure of FIG. 7.

FIG. 1 shows an illuminating device which an observer views in direction 21. The device includes a light guide structure 1, which is held within housing 2 and over which is positioned cover plate 3 that carries on its face symbols or other indicia which are to be illuminated. Housing 2 comprises two frame members 4, which are joined by a bridge 5. Bridge 5 includes suitable supports for receiving two conventional electric light sources 22. Frame members 4 include front openings 7, which corresponds in position to the openings 8 in light guide structure 1 and which permit access to operating knobs, or the like, extending out of the illuminating device.

Light guide structure 1 comprises two ring shaped bodies 9, which are integrally formed with and joined by central joining bridge 10. Structure 1 is comprised of an appropriately transparent, conventional, light transmitting material, e.g., glass, or a plastic material known by the trademark Lucite. Ring bodies 9 define flat walled 24 openings 8 through which the display on cover plate 3 is viewed. The illumination transmitted by ring bodies 9 illuminates openings 8 and cover plate 3.

Bridge 10 has interior openings 6, each for receiving an electric light bulb 22. These bulbs comprise the central source of light for structure 1.

In the center of bridge 10, between openings 6, structure 1 is provided with a V-shaped groove 11, which defines two V-ed surfaces that together act as a prism formation at the center of the bridge. Prism formation 11 is transverse to the normal direction of light transmission from each source 22 across bridge 10 and groove 11. The groove causes more intense illumination of the portions of the display that are visible through openings 8 adjacent to the center of bridge 10.

Ring shaped bodies 9 of structure 1 are shaped so that the interior sides 25 of their external surfaces cooperate to reflect light that is incident upon interior sides 25 at an angle greater than a predetermined critical angle of incidence. Any light incident on the sides 25 at an angle less than the critical angle passes through the respective external surface and illuminates the surrounding area.

As shown in FIG. 1, lower surface 12 of structure 1 is flat and is positioned above cover plate 3 to be illuminated. At bridge 10, lower surface 12 and upper surface 13 of structure 1 are parallel. Away from bridge 10, upper surface 13 of structure 1 is spheroidally curved or arched, as is apparent from the side view, FIG. 3, and the cross-section view, FIG. 4, so that the rectangular cross-section of structure 1 in FIG. 5 merges into a generally triangularly cross-sectioned region 15 in the direction away from light source openings 6. This inherently produces a surface 25A which gradually twists from the more horizontal orientation generally parallel to surface 13, as shown in FIG. 4, to the more vertical orientation transverse to surface 13, as shown in FIG. 3. As a result, light emanating from openings 6 and moving outwardly toward the remote end 26 of structure 1 is incident upon downwardly spheroidally curving interior side 25 of upper surface 13 of guide structure 1 and upon the interior side of gradually twisting surface 25A. The spheroidal concave curvature of this interior side causes each reflection of light from surface 13 back toward flat lower surface 12 to be at a smaller angle of incidence upon side 25 of surface 12, as schematically suggested in FIG. 3, and each successive reflected light ray is shorter in length. The shorter and closer light rays toward the narrower rim region at end 26 of light guide structure 1 causes gradual intensification of the remaining light that has not already passed out of body structure 1 and thereby aids in the emission from ring body 9 of light of generally uniform intensity further from light source openings 6 than would otherwise be possible. Whenever the angle of incidence of some of the light on side 25 of surface 12 is less than the critical angle, the reflected light is emitted through surface 12 to illuminate cover plate 3. This arrangement causes substantially uniform illumination across the length of body structure 1. Furthermore, this makes it possible to indirectly illuminate the regions remote from light openings 6.

In a further situation, not shown, the ring shaped regions 9 may be provided with a surrounding illuminated surface.

FIGS. 7 and 8 show a modified light guide using the principle of the present invention. Light guide body 16 is provided along its edge rims with prism shaped body sections 17 which are joined to body 16 at their ends by cross-bar support elements 27 and which are separated from body 16 along its edge rims by respective slit openings or air gaps 19. Light guide body 16 and sections 17 are also comprised of one of the aforementioned light transmitting materials. Light is provided by a single centrally disposed light source 18. The light is transmitted outwardly through light guide body 16 across gaps 19 to prism shaped bodies 17, which are disposed transversely to the normal transmission of light through body 16. Light travels into bodies 17 and is directed along the bodies because of their prismatic shape. The prism shaped bodies 17 do not rely upon surface curvature, as in the embodiment of FIGS. 1-6, but instead rely upon their prismatic shape to transmit the light along the length of body 16.

Although the present invention has been described in connection with a preferred embodiment thereof, many variations and modifications will now become apparent to those skilled in the art. It is preferred, therefore, that the present invention be limited not by the specific disclosure herein, but only by the appended claims.

I claim:

1. A light guide structure for uniformly illuminating a display below an opening through said structure:

said structure being comprised of a block of light transmitting material; said block having a first and second end and a top and a bottom surface;

a receptacle for a light source, which said receptacle is disposed away from said first end and is positioned to cause light to be transmitted through said block toward said first end;

said block being defined in shape by external surfaces having interior sides facing inwardly into said block; said interior sides of said external surfaces of said block having reflective capability when light is incident thereupon at less than a critical angle;

an opening passing through said block and through said top and bottom surfaces and being located between said light source receptacle and said first end; an end portion of said block surrounding said opening and having a wall facing into and defining said opening;

said end portion having a generally rectangular cross-section across said top and bottom surfaces in the vicinity of said light source receptacle and having its cross-section gradually change shape, moving away from said light source receptacle toward said one end, into a generally triangular shape, with the apex directed outwardly from said opening; said cross-section of said end portion also gradually decreasing in height between said top and said bottom surfaces moving away from said light source receptacle toward said one end; all of this cross-section change giving said end portion a generally spheroidal shape that is concave with respect to said exterior surface interior sides;

the aforesaid changes in said block cross-section causing one said interior side of an external surface of said end portion to gradually twist, moving away from said light source receptacle toward said one end and thus also moving around said opening to cause said one interior side to cooperate with the other said interior sides to reflect light generally uniformly around said opening moving from said light source receptacle to said first end.

2. The light guide structure of claim 1, wherein said light source receptacle is positioned generally centrally between said first and said second ends and both said ends and the said portions of said structure leading to those said ends having the aforesaid characteristics of the first said end and the said end portion leading thereto.

3. The light guide structure of claim 1, wherein it is said top surface of said block that changes to change the shape and cross-section of said end portion.

4. An illuminating device, including the light guide structure of Claim 3, and further comprising:

a framework supporting said structure; said framework carrying a display to be illuminated; said display being positioned across said structure and across said structure opening and adjacent the said bottom surface of said structure.

5. The light guide structure of claim 1, wherein said structure has a prismatically shaped region that extends transversely to the normal transmission of light through said structure for intercepting the light and intensifying light in the vincinity of said prismatically shaped region.

6. The light quide structure of claim 5, wherein said prismatically shaped region comprises a notch in the said structure external surface that carries said interior side that is curved.

7. The light guide structure of claim 1, wherein said opening is round and said end portion is rounded in a manner to encircle said opening.

8. The light guide structure of claim 7, wherein said block has peripheral edges which extend into and become part of said end portion; said light source receptacle being at said peripheral edges, thereby to transmit light straight into said end portion around said opening along both said peripheral edges and to said first end.

9. The light guide structure of claim 8, wherein said light source receptacle is positioned generally centrally between said first and said second ends and both said ends and the said portions of said structure leading to those said ends having the aforesaid characteristics of the first said end and the said end portion leading thereto.

10. An illuminating device for carrying illumination to a remote location, said device comprising:

a light guide structure having a light transmitting capability and being supportable in means for supporting a light guide structure before a display to be illuminated; said structure having a first and second end; a light source disposed away from at least one of said ends and positioned to transmit light through said structure;

said structure having a prismatically shaped region that extends transversely to the normal transmission of light through said structure for intercepting the light and intensifying light in the vincinity of said prismatically shaped region;

said prismatically shaped region extending along the length of said structure from said light source to the one said end; said structure having a rim away from said light source and said prismatically shaped region extending along said rim.

11. The illuminating device of claim 10, wherein said prismatically shaped region comprises a prismatically shaped body; means supporting said prismatically shaped body spaced away from and across an air gap from said structure and from said light source.

* * * * *